United States Patent Office 3,630,986
Patented Dec. 28, 1971

3,630,986
PROCESS FOR THE PREPARATION OF SOLUTIONS OF ACRYLONITRILE POLYMERS
Andre Mison and Philippe Tarbouriech, Lyon, France, assignors to Rhone-Poulenc S.A., Paris, France
No Drawing. Filed June 26, 1970, Ser. No. 50,320
Claims priority, application France, June 30, 1969, 6922015
Int. Cl. C08f 45/44, 45/46
U.S. Cl. 260—30.8      6 Claims

ABSTRACT OF THE DISCLOSURE

Spinnable acrylonitrile polymer solutions are made by evaporating the water from a thin film of a wet dispersion of the polymer in a solvent therefor having a boiling point higher than water.

---

This invention relates to the preparation of spinnable solutions of acrylonitrile polymers, i.e. solutions which can be employed for the manufacture of yarns and films by the customary methods of spinning and casting. The term "acrylonitrile polymer" as used herein means a filament-forming polymer containing a substantial proportion of acrylonitrile (—$CH_2$—$CH(CN)$—) units, more particularly an acrylic polymer containing at least 85% by weight of acrylonitrile units or a modacrylic polymer containing 35% to 85% by weight of acrylonitrile units.

It is known to prepare solutions of acrylonitrile polymers made by polymerisation in an aqueous medium, by heating these polymers in the chosen solvent. It is then essential, before they are dissolved, to remove the greater part of the water retained by the polymer after it has been isolated from the polymerisation medium and suction-dried. In effect, the presence of a large amount of water interferes with the dissolution process and renders spinning difficult. A simple means of drying consists of heating the moist polymer, which implies exposing the polymer to temperatures of the order of 100° C. for a certain time; but films manufactured from a polyacrylonitrile dried in this way do not possess the requisite properties and sufficient whiteness. In order to avoid this prolonged heating, it has been proposed to wash the moist polymer with a solvent such as dimethylformamide so as to reduce the water content of the polymer (see French Pat. No. 1,266,100). However, to prepare spinning solutions it is necessary to carry out several successive washes before a polymer is obtained from which a solution can be prepared, and such solutions still contain 5 to 6% of water. It has been proposed to lower the water content of the moist polymer by washing with an organic solvent which is miscible with water and is a non-solvent for the polymer (see U.S. Pat. No. 3,313,758). This process requires large amounts of the non-solvent to be employed, several successive washes to reduce the water content, and then several washes with the solvent selected for dissolving the polymer so as to limit the content of the non-solvent of the polymer in the solution finally obtained.

The present invention provides a process by which it is possible simply and rapidly to prepare solutions of polymers of acrylonitrile from moist polymers obtained by polymerisation in an aqueous medium, without having to subject these polymers beforehand to drying by heat or by repeated washes with organic solvents. The new process may be operated continuously with removal of water retained by the polymer and simultaneous dissolution of the polymer in an organic solvent. This process comprises subjecting a thin film of a dispersion of wet acrylonitrile polymer in a solvent therefor having a boiling point higher than that of water to conditions of temperature and pressure such that the said water is removed by evaporation to form a solution of the said polymer in the said solvent therefor. The process is conveniently operated by passing the dispersion through a thin film evaporation device in which the water is removed by distillation whilst the polymer dissolves. Limpid and perfectly homogeneous polymer solutions are thus obtained.

In practice, the dispersion of moist polymer can be prepared in a vat provided with a stirrer, and a thin film evaporator is supplied continuously with the dispersion, the polymer solution being withdrawn therefrom while the water distils off, carrying with it a certain amount of solvent which can subsequently be recycled after it has been freed of the water which it contains. Any thin film evaporator of known type can be used, such as those described, for example, in Chemie Ingenieur Technik (1955), No. 5, pages 257 to 261. In particular, a dynamic evaporator can be used which comprises a stirrer system, which spreads a film of the dispersion over the wall of the evaporator and hence ensures a particularly efficient material exchange and heat exchange. The dwell time of the mixture of polymer and solvent in the evaporator can vary from several tens of seconds to several minutes depending on the time required to remove the water. It can be regulated by the delivery pump connecting the mixer to the evaporator. The process can then be very simply operated, and the operating conditions (temperature of the heating jacket of the evaporator, pressure, dwell time, feed rate and withdrawal rate) are determined first by the water content of the moist polymer cake and secondly by the concentration and the viscosity of the polymer solution which it is desired to prepare.

Generally speaking evaporators of the aforementioned type are operated under conditions such that the film has a thickness of less than 1 mm., and the dispersion is subjected to a temperature of 0° to 50° C. under a pressure below 100 mm. Hg. The heating jacket may have (and generally does have) a substantially higher temperature up to (say) 200° C. in order to ensure rapid transfer of heat to the dispersion and consequent rapid evaporation of the water and dissolution of the polymer. Obviously the rate of feed of the polymer dispersion is as high as is consistent with obtaining a polymer solution of the desired quality.

The polymers which can be treated in accordance with the process are homopolymers and copolymers of acrylonitrile which are used for the manufacture of yarns and films and which have been prepared by customary techniques of polymerisation in an aqueous medium. When these polymers have been isolated from the polymerisation mass by filtration followed by suction-filtration, they retain an amount of water which is still large and can be as much as 200% of their own weight, depending on the process used for the suction-filtration.

The solvents which can be used are solvents for polyacrylonitrile such as dimethylformamide, dimethylacetamide, dimethylsulphoxide and quite generally those having a boiling point above that of water, and thus do not interfere with the removal of the latter in the evaporator. The amount of solvent employed depends on the viscosity of the solution which it is desired to obtain, also taking into account the amount of solvent, sometimes large, which is carried away by the water issuing from the evaporator.

Generally speaking the polymer dispersion fed to the thin film evaporator contains 5 to 30% by weight of the polymer, 5 to 50% by weight of water and 50 to 90% by weight of the said solvent, the proportion of water being not more than twice that of the polymer.

The process of the invention is preferably carried out continuously.

The examples which follow illustrate this process without implying a limitation.

EXAMPLE 1

60 kg. of dimethylformamide and 18.60 kg. of a filter cake of an acrylonitrile polymer containing 46.2% of water are introduced into a mixer equipped with an efficient stirrer. The polymer is a terpolymer consisting of 69% of acrylonitrile/30% of vinylidene chloride/1% of potassium vinyloxybenzenesulphonate, prepared by emulsion polymerisation, and then separated from the reaction mixture, washed with water, and suction-filtered. The suspension produced has the following composition: polymer, 12.7% by weight; water, 10.95% by weight; and dimethylformamide, 76.35% by weight.

A dynamic thin film evaporator having an exchange surface of 10 dm.$^2$, equipped with an axial stirrer and heated by steam at 128° C., condensing in the double jacket, is continuously fed with this suspension. An absolute pressure of 49 mm. of mercury is maintained inside the evaporator. The feed rate is 17.1 kg./hour. When the stationary state is reached, a homogeneous solution of polymer of the following composition: polymer, 20.2% by weight; water, 2.85% by weight; and dimethylformamide, 76.95% by weight, and having a viscosity of 210 poises at 20° C. is withdrawn at a rate of 10.8 kg./hour. This solution was used to obtain a yarn which showed excellent properties.

EXAMPLE 2

A moist cake of polyacrylonitrile prepared in the same manner as in Example 1 and containing 40.8% by weight of water after suction-filtration is treated as in Example 1. A dispersion in dimethylformamide is prepared, containing polymer, 14.2% by weight; water, 10.1% by weight; and solvent, 75.7% by weight.

The temperature of the heating jacket of the evaporator is kept at 142.5° C. and the absolute pressure is kept to 50 mm. of mercury. The feed rate of suspension is 15.4 kg./hour. A solution having the following composition: polymer, 20.7% by weight; water, 3.16% by weight; and solvent, 76.14% by weight and having a viscosity of 300 poises at 20° C. is withdrawn under these conditions at the rate of 11.5 kg./hour. The distillate contains 25.90% of water and 74.10% of solvent.

EXAMPLE 3

A moist cake of a polyacrylonitrile containing 41% of water after suction-filtration, and consisting of 93.8% of acrylonitrile, 5.2% of methyl methacrylate and 1.0% of potassium vinyloxybenzenesulphonate, prepared by polymerization in aqueous emulsion, is treated as in the preceding examples. A dispersion in dimethylofarmamide is prepared, having the following composition: polymer, 13.7% by weight; water 9.55% by weight; and solvent, 76.75% by weight.

The temperature of the jacket of the evaporator is 159° C. and the absolute pressure is 82 mm. Hg. The feed rate of the suspension to the evaporator is 20.5 kg./hour. A solution having the composition: polymer, 19.6% by weight; water, 3.77% by weight; and solvent, 76.63% by weight and having a viscosity of 588 poises at 20° C. is withdrawn under these conditions, at the rate of 14.35 kg./hour.

These examples show that moist cakes containing large amounts of water can be dissolved and that the solutions thus obtained only contain a small amount of water. It is also seen that it is possible, by varying the working conditions (feed of the evaporator, temperature and pressure) to obtain more or less viscous solutions (200 to 600 poises) depending on the use to which they are to be put.

We claim:

1. Process for the preparation of a spinnable solution of an acrylonitrile polymer which comprises subjecting a thin film of a dispersion of wet acrylonitrile polymer in a solvent therefor having a boiling point higher than that of water to conditions of temperature and pressure such that the said water is removed by evaporation to form a solution of the said polymer in the said solvent therefor.

2. Process according to claim 1 in which the said solvent is dimethylformamide, dimethylacetamide or dimethylsulphoxide.

3. Process according to claim 1 in which the said dispersion comprises 5 to 30% by weight of the said polymer, 5 to 50% by weight of water, and 50 to 90% by weight of the said solvent, the proportion of water being not more than twice that of the said polymer.

4. Process according to claim 1 in which the said film is less than 1 mm. thick and the said dispersion is subjected to a temperature of 0° to 50° C. under a pressure below 100 mm. Hg.

5. Process according to claim 1 in which the said polymer is a filament-forming acrylic polymer containing at least 85% by weight of acrylonitrile units or a filament-forming modacrylic polymer containing 35% to 85% by weight of acrylonitrile units.

6. Process according to claim 1 in which the process is effected continuously.

References Cited

UNITED STATES PATENTS

| | | | |
|---|---|---|---|
| 2,883,360 | 4/1959 | Coover et al. | 260—45.5 |
| 3,044,975 | 7/1962 | Gerber | 260—32.6 |
| 3,113,158 | 4/1967 | Apperson et al. | 260—29.6 |
| 3,328,333 | 6/1967 | Damnelly et al. | 260—30.4 |

MORRIS LIEBMAN, Primary Examiner

R. ZAITLEN, Assistant Examiner

U.S. Cl. X.R.

260—29.6 AN, 32.6 N, 34.2 R, 88.7 R